(12) United States Patent
Yong et al.

(10) Patent No.: US 12,107,516 B2
(45) Date of Patent: Oct. 1, 2024

(54) TRIBOELECTRIC GENERATOR USING LUBRICANT-INFUSED SURFACE CONTROLLED BY MAGNETIC FIELD AND METHOD OF MANUFACTURING SAME

(71) Applicant: POSTECH Research and Business Development Foundation, Pohang-si (KR)

(72) Inventors: Kijung Yong, Pohang-si (KR); Soyeon Yun, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 105 days.

(21) Appl. No.: 18/067,893

(22) Filed: Dec. 19, 2022

(65) Prior Publication Data

US 2024/0048073 A1 Feb. 8, 2024

(30) Foreign Application Priority Data

Jul. 29, 2022 (KR) .................. 10-2022-0094689

(51) Int. Cl.
*H02N 1/04* (2006.01)
*F16N 99/00* (2006.01)

(52) U.S. Cl.
CPC ............ *H02N 1/04* (2013.01); *F16N 99/00* (2013.01); *F16N 2210/20* (2013.01); *F16N 2270/00* (2013.01)

(58) Field of Classification Search
CPC ....... H02N 1/04; F16N 99/00; F16N 2210/20; F16N 2270/00; B32B 3/30; B32B 7/025; B32B 25/04; B32B 27/06

(Continued)

(56) References Cited

U.S. PATENT DOCUMENTS

| 6,714,487 B2 * | 3/2004 | Schafroth | .............. G04C 3/008 368/203 |
| 2022/0034174 A1 * | 2/2022 | Gooneratne | .............. E21B 7/24 |

FOREIGN PATENT DOCUMENTS

| EP | 3131195 | * 2/2017 |
| KR | 10-2017-0002424 | 1/2017 |

OTHER PUBLICATIONS

Bioinspired Slippery Lubricant-Infused Surfaces With External Stimuli Responsive Wettability (Year: 2019).*

(Continued)

*Primary Examiner* — Ahmed Elnakib
(74) *Attorney, Agent, or Firm* — LEX IP MEISTER, PLLC

(57) ABSTRACT

Proposed are triboelectric generator using a lubricant-infused surface controlled by a magnetic field and a manufacturing method thereof. The triboelectric generator 10 includes a substrate 100, an electrode unit 200 positioned on the substrate 100 and including a first electrode 210 and a second electrode 220, a stabilization layer 300 positioned on the substrate 100 and the electrode unit 200 and including a first elastic polymer 310, and a magneto-controllable unit 400 positioned on the stabilization layer 300 and including a lubricant 420 and a plurality of protrusion-shaped microcomposites 410, in which the microcomposite includes a magnetic material 411 and a second elastic polymer 412. The protrusion-shaped microcomposite is partially immersed in the lubricant, improves power generation efficiency, and can perform reversible switching according to the direction of the magnetic field.

16 Claims, 11 Drawing Sheets

(58) Field of Classification Search
USPC .................................................. 310/309, 310
See application file for complete search history.

(56) References Cited

OTHER PUBLICATIONS

KIPO, Office Action of application No. 10-2022-0094689, dated Dec. 27, 2023.
Xian Yang et al., "Bioinspired Slippery Lubricant-Infused Surfaces With External Stimuli Responsive Wettability. A Mini Review.", Frontiers in Chemistry, Nov. 2019, vol. 7, Article 826, Nov. 29, 2019.
Chen Yang et al., "Droplet manipulation on superhydrophobic surfaces based on external stimulation: A review.", Advances in Colloid and interface Science 306 (2022) 102724, Jun. 25, 2022.

* cited by examiner

TRIBOELECTRIC GENERATOR USING LUBRICANT-INFUSED SURFACE CONTROLLED BY MAGNETIC FIELD AND METHOD OF MANUFACTURING SAME The present application claims priority to Korean Patent Application No. 10-2022-0094689, filed Jul. 29, 2022, the entire contents of which is incorporated herein for all purposes by this reference.

BACKGROUND OF THE INVENTION

1. Field of the Invention

The present disclosure relates to a triboelectric generator using a lubricant-infused surface controlled by a magnetic field and to a manufacturing method thereof.

2. Description of the Related Art

Triboelectric nanogenerators (TENGs) are increasingly attracting attention as renewable power source that converts mechanical energy into electrical energy. Their mechanism of action is based on a combination of triboelectric charge and electrostatic induction. When two materials of different triboelectric polarities are brought into contact, electron or ionic transfer induces a potential difference across the contact surfaces. As the cycle of contact and separation repeats, electrons flow through the external load and produce a continuous electrical output.

Triboelectric nanogenerators based on liquid-solid (LS) triboelectric charging have recently attracted attention. In particular, water droplet-driven triboelectric nanogenerators are very useful because water energy sources are ubiquitous in the form of rivers, waves, and raindrops. However, there is a problem in that the generated power is too low to use the liquid-solid triboelectric nanogenerator as an efficient power source.

In addition, an intelligent approach at low power consumption is required to extend the applicability of triboelectric nanogenerators. For example, there are those that enable reversible switching of electrical outputs by external stimuli, which have wide applications in self-powered sensors and switches. However, despite the need for such a switching ability, few studies have been conducted on the reversible switching of liquid-solid triboelectric charge.

Therefore, research on a liquid-solid triboelectric nanogenerator capable of reversible switching with high generated power and a manufacturing method thereof is required.

SUMMARY OF THE INVENTION

An objective of the present disclosure is to solve the above problems and to provide a liquid-solid triboelectric nanogenerator capable of switching according to the direction of a magnetic field with high generated power and a manufacturing method thereof.

In addition, another objective of the present disclosure is to provide a liquid-solid triboelectric nanogenerator having excellent reversibility and stability even in repeated switching cycles and a manufacturing method thereof.

In addition, another objective of the present disclosure is to provide a liquid-solid triboelectric nanogenerator that can be continuously used even in high humidity and a manufacturing method thereof.

In addition, the other objective of the present disclosure is to provide a liquid-solid triboelectric nanogenerator that can be used in low-power consumption applications such as wireless switches and self-powered sensors and a manufacturing method thereof.

According to one aspect of the disclosure, provided is a triboelectric generator 10 in which the triboelectric generator includes: a substrate 100; an electrode unit 200 positioned on the substrate 100 and including a first electrode 210 and a second electrode 220; a stabilization layer 300 positioned on the substrate 100 and the electrode unit 200 and including a first elastic polymer 310; and a magneto-controllable unit 400 positioned on the stabilization layer 300 and including a lubricant 420 and a plurality of protrusion-shaped microcomposites 410, in which the microcomposite includes a magnetic material 411 and a second elastic polymer 412, and the protrusion-shaped microcomposite is partially immersed in the lubricant.

In addition, the triboelectric generator 10 may generate electrical energy by contact between a liquid droplet falling on the magneto-controllable unit 400 and the microcomposite 410 of the magneto-controllable unit.

In addition, the electrical energy may be generated by at least one selected from the group consisting of a triboelectric charging phenomenon and an electrostatic induction phenomenon generated by the contact.

In addition, the droplets may include at least one selected from the group consisting of water and ionic liquids.

In addition, the protrusion may have any one shape selected from the group consisting of a conical shape, a polygonal pyramidal shape, a cylindrical shape, a polygonal columnar shape, and a combination thereof.

In addition, the substrate 100 may include one or more selected from the group consisting of glass, silicon, nickel, stainless steel, zinc-coated carbon steel, pure carbon steel, copper, titanium, zinc, steel, polyester, polyimide, polyamide, polyethylene, polypropylene, fluorine-doped tin oxide (FTO), indium tin oxide (ITO), indium zinc oxide (IZO), indium zinc tin oxide (IZTO), aluminum zinc oxide (AZO), indium tin oxide-silver-indium tin oxide (ITO—Ag—ITO), indium zinc oxide-silver-indium zinc oxide (IZO—Ag—IZO), indium zinc tin oxide-silver-indium zinc tin oxide (IZTO—Ag—IZTO), and aluminum zinc oxide-silver-aluminum zinc oxide (AZO—Ag-AZO).

In addition, the first electrode 210 and the second electrode 220, respectively, include one or more selected from the group consisting of Al, Au, Ag, Be, Bi, Co, Cu, Cr, Cd, Fe, Ga, Hf, In, Ir, Mn, Mo, Mg, Ni, Nb, Pb, Pd, Pt, Rh, Re, Ru, Sb, Sn, Ta, Te, Ti, V, W, Zr, Zn, FTO, and ITO.

In addition, the first elastic polymer 310 may include one or more selected from the group consisting of polydimethylsiloxane (PDMS), ecoflex, silicone rubber, fluoro silicone rubber, vinylmethyl silicone rubber, styrene-butadiene-styrene (SBS) block copolymer, styrene-ethylene-butylene-styrene (SEBS) block copolymer, styrene-isoprene-styrene (SIS) block copolymer, styrene-butadiene rubber (SBR), butadiene rubber (BR), isobutylene-isoprene rubber (IIR), ethylene-propylene rubber (EPR), ethylene-propylene-diene monomer rubber (EPDM), isoprene rubber (IR), isobutylene rubber (IR), acryl rubber, acrylonitrile-butadiene Rubber (ABR), polyurethane, polyether-urethane rubber, polyester-urethane rubber, epichlorohydrin rubber, polychloroprene, polytetrafluoroethylene (PTFE), fluorinated ethylene propylene (FEP), and fluoropolymers.

In addition, the magnetic material 411 may include one or more selected from the group consisting of cobalt (Co), iron (Fe), nickel (Ni), chromium (Cr), aluminum (Al), samarium (Sm), neodymium (Nd), and an alloy thereof.

In addition, the second elastic polymer 412 may include one or more selected from the group consisting of polydimethylsiloxane (PDMS), ecoflex, silicone rubber, fluoro silicone rubber, vinylmethyl silicone rubber, styrene-butadiene-styrene (SBS) block copolymer, styrene-ethylene-butylene-styrene (SEBS) block copolymer, styrene-isoprene-styrene (SIS) block copolymer, styrene-butadiene rubber (SBR), butadiene rubber (BR), isobutylene-isoprene rubber (IIR), ethylene-propylene rubber (EPR), ethylene-propylene-diene monomer rubber (EPDM), isoprene rubber (IR), isobutylene rubber (IR), acryl rubber, acrylonitrile-butadiene rubber (ABR), polyurethane, polyether-urethane rubber, polyester urethane, epichlorohydrin rubber, polychloroprene rubber, polytetrafluoroethylene (PTFE), fluorinated ethylene propylene (FEP), and fluoropolymers.

In addition, the first elastic polymer 310 may be of the same type as the second elastic polymer 412.

In addition, the lubricant 420 may include at least one selected from the group consisting of perfluorinated oil, silicone oil, dimethylsiloxane oligomer, hydroxy dimethylsiloxane oligomer, mineral oil, and a combination thereof.

In addition, the microcomposite 410 is coated on a part or the entire surface and further includes a coating layer 413 containing a superhydrophobic material, in which the superhydrophobic material may include at least one selected from the group consisting of $SiO_2$, polystyrene, and $TiO_2$ surface-treated with any one selected from the group consisting of dodecyltrichlorosilane, 1H, 1H, 2H, 2H-perfluorooctyltriethoxysilane, and n-octadecyltrithoxysilane.

In addition, the triboelectric generator may be used as a self-powered magnetic field sensor.

According to one aspect of the disclosure, provided is a switch including: a substrate 100; an electrode unit 200 positioned on the substrate 100 and including a first electrode 210 and a second electrode 220; a stabilization layer 300 positioned on the substrate 100 and the electrode unit 200 and including a first elastic polymer 310; a magneto-controllable unit 400 positioned on the stabilization layer 300 and including a lubricant 420 and a plurality of protrusion-shaped microcomposites 410; and a magnet unit 500 positioned at a predetermined portion on the substrate 100 in a direction opposite to the direction facing the electrode unit 200, movable in the direction of the surface of the substrate 100, and including a magnet 510, in which the microcomposite includes a magnetic material 411 and a second elastic polymer 412, and the protrusion-shaped microcomposite is partially immersed in the lubricant.

In addition, the switch may be in an ON state, the magnet 510 may form a magnetic field in the microcomposite 410 in a vertical direction to the substrate 100, a lower end of the protrusion-shaped microcomposite 410 may be immersed in the lubricant, and the upper end, which is the remaining portion, may not be immersed in the lubricant.

In addition, the switch may be in an OFF state, and the magnet 510 may form a magnetic field in the microcomposite 410 in a direction other than a vertical direction on the substrate, and the protrusion-shaped microcomposite 410 may be entirely immersed in a lubricant.

Another aspect of the present disclosure provides a method for manufacturing a triboelectric generator, the method including: (a) forming an electrode unit 200 including a first electrode 210 and a second electrode 220 on a substrate 100; (b) coating a first elastic polymer 310 on the substrate 100 and the electrode unit 200 to form a stabilization layer 300 including the first elastic polymer 310; (c) forming a plurality of protrusion-shaped microcomposites 410 by coating a solution containing a magnetic material 411 and a second elastic polymer 412 with the stabilization layer 300; and (d) manufacturing a triboelectric generator 10 by injecting a lubricant 420 to partially immerse the plurality of the protrusion-shaped micro composites 410 to form a magneto-controllable unit 400.

In addition, the step (c) may include: (c-1) primarily coating a mixed solution including a magnetic material 411 and a second elastic polymer 412 on the stabilization layer 300; (c-2) secondarily coating the mixed solution on the stabilization layer 300; and (c-3) forming a magnetic field in a vertical direction on the substrate 100 using a magnet and annealing to form a plurality of protrusion-shaped microcomposites 410.

In addition, the annealing may be performed at a temperature in a range of 80° C. to 120° C.

In addition, the method of manufacturing a triboelectric generator may further include (c') coating a portion or the entire surface of the microcomposite 410 with a superhydrophobic material to form a coating layer 413 including the superhydrophobic material after step (c).

According to another aspect of the present disclosure, provided is a method for manufacturing a switch, the method including: (1) forming an electrode unit 200 including a first electrode 210 and a second electrode 220 on a substrate 100; (2) coating a first elastic polymer 310 on the substrate 100 and the electrode unit 200 to form a stabilization layer 300 including the first elastic polymer 310; (3) forming a plurality of protrusion-shaped microcomposites 410 by coating a solution containing a magnetic material 411 and a second elastic polymer 412 on the stabilization layer 300; (4) manufacturing a triboelectric generator 500 by injecting a lubricant 420 to partially immerse the plurality of protrusion-shaped micro composites 410 to form a magneto-controllable unit 400; and (5) manufacturing a switch by positioning on a predetermined portion of the substrate 100 in a direction opposite to a direction facing the electrode unit 200, moving in a plane direction of the substrate 100, and forming a magnet unit 500 including a magnet 510.

The triboelectric generator of the present disclosure has high generated power and is capable of reversible switching according to the direction of the magnetic field. Specifically, there is an effect of having a reversible wet state by including multiple microcomposites with different alignment states according to a change in a magnetic field direction.

In addition, the triboelectric generator of the present disclosure has the effect of having excellent reversibility and stability even in repeated ON/OFF switching cycles.

In addition, the triboelectric generator of the present disclosure can be continuously used even in high humidity and can be used in low-power consumption applications such as wireless switches and self-powered sensors.

BRIEF DESCRIPTION OF THE DRAWINGS

Since the accompanying drawings are for reference in describing exemplary embodiments of the present disclosure, the technical spirit of the present disclosure should not be construed as being limited to the accompanying drawings.

DESCRIPTION OF THE PREFERRED EMBODIMENTS

Hereinafter, examples of the present disclosure will be described in detail with reference to the accompanying drawings in such a manner that the ordinarily skilled in the art can easily implement the present disclosure.

The description given below is not intended to limit the present disclosure to specific embodiments. In relation to describing the present disclosure, when the detailed description of the relevant known technology is determined to unnecessarily obscure the gist of the present disclosure, the detailed description may be omitted.

The terminology used herein is for the purpose of describing particular embodiments only and is not intended to limit the scope of the present disclosure. As used herein, the singular forms "a", "an", and "the" are intended to include the plural forms as well unless the context clearly indicates otherwise. In the present application, the terms "include" or "have" are intended to designate the existence of features, numbers, steps, actions, components, or combinations thereof as stated in the specification and should be understood not to preclude the existence or addition of one or more other features, numbers, steps, actions, components, or a combination thereof.

Terms including ordinal numbers used in the specification, "first", "second", etc., can be used to discriminate one component from another component, but the order or priority of the components is not limited by the terms unless specifically stated. These terms are used only for the purpose of distinguishing a component from another component. For example, without departing from the scope of the present disclosure, a first component may be referred to as a second component, and similarly, a second component may also be referred to as a first component.

In addition, when it is mentioned that a component is "formed" or "stacked" on another component, it should be understood such that one component may be directly attached to or directly stacked on the front surface or one surface of the other component, or an additional component may be disposed between them.

Hereinafter, a triboelectric generator using a lubricant injection surface controlled by a magnetic field and a manufacturing method thereof will be described in detail.

However, those are described as examples, and the present disclosure is not limited thereto and is only defined by the scope of the appended claims.

The lubricant-infused surfaces are surfaces obtained by injecting or swelling lubricants into a substrate and have repellency with respect to various liquids. At this time, the substrate must have a porous or hierarchical structure.

Figure 1:
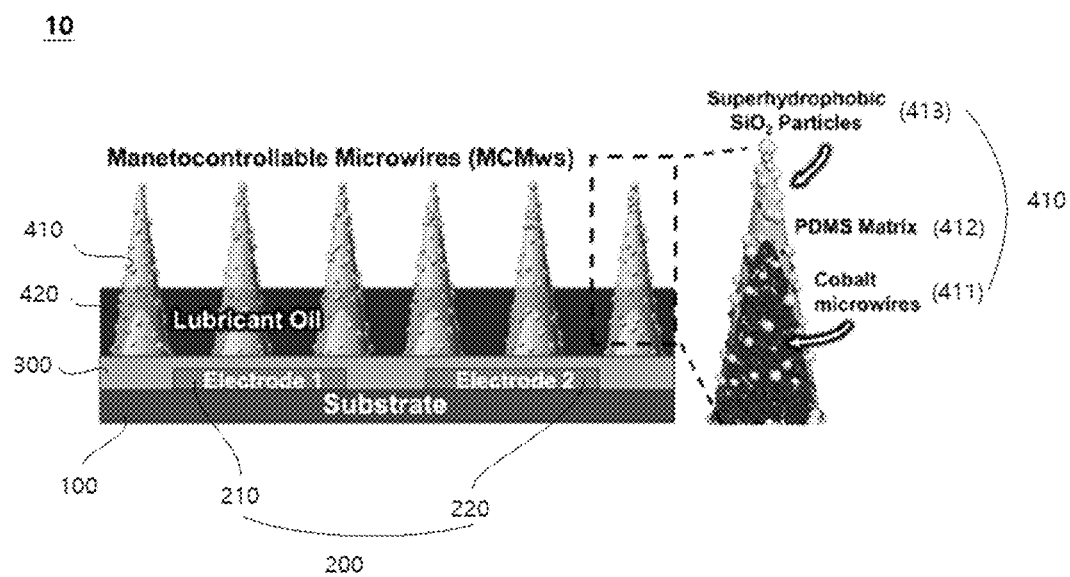
FIG. 1 shows a schematic diagram of a triboelectric generator according to one embodiment of the present disclosure.

FIG. 1 shows a schematic diagram of a triboelectric generator according to one embodiment of the present disclosure.

Referring to FIG. 1, the present disclosure provides a triboelectric generator 10 including: a substrate 100; an electrode unit 200 positioned on the substrate 100 and including a first electrode 210 and a second electrode 220; a stabilization layer 300 positioned on the substrate 100 and the electrode unit 200 and including a first elastic polymer 310; and a magneto-controllable unit 400 positioned on the stabilization layer 300 and including a lubricant 420 and a plurality of protrusion-shaped microcomposites 410, in which the microcomposite includes a magnetic material 411 and a second elastic polymer 412, and a protrusion-shaped microcomposite is partially immersed in the lubricant.

In addition, the triboelectric generator 10 may generate electrical energy by contact between a liquid droplet falling on the magneto-controllable unit 400 and the microcomposite 410 of the magneto-controllable unit.

In addition, the electrical energy may be generated by at least one selected from the group consisting of a triboelectric charging phenomenon and an electrostatic induction phenomenon generated by the contact.

In addition, the droplets may include at least one selected from the group consisting of water and ionic liquids.

In addition, the protrusion may have any one shape selected from the group consisting of a conical shape, a polygonal pyramidal shape, a cylindrical shape, a polygonal columnar shape, and a combination thereof.

In addition, the substrate 100 may include one or more selected from the group consisting of glass, silicon, nickel, stainless steel, zinc-coated carbon steel, pure carbon steel, copper, titanium, zinc, steel, polyester, polyimide, polyamide, polyethylene, polypropylene, indium zinc oxide (IZO), indium zinc tin oxide (IZTO), aluminum zinc oxide (AZO), indium tin oxide-silver-indium tin oxide (ITO—Ag—ITO), indium zinc oxide-silver-indium zinc oxide (IZO—Ag—IZO), indium zinc tin oxide-silver-indium zinc tin oxide (IZTO—Ag—IZTO), and aluminum zinc oxide-silver-aluminum zinc oxide (AZO—Ag-AZO), and preferably may include glass.

In addition, the first electrode 210 and the second electrode 220 are respectively including one or more selected from the group consisting of Al, Au, Ag, Be, Bi, Co, Cu, Cr, Cd, Fe, Ga, Hf, In, Ir, Mn, Mo, Mg, Ni, Nb, Pb, Pd, Pt, Rh, Re, Ru, Sb, Sn, Ta, Te, Ti, V, W, Zr, Zn, FTO, and ITO, and preferably may include Al.

In addition, the first elastic polymer 310 may include one or more selected from the group consisting of polydimethylsiloxane (PDMS), ecoflex, silicone rubber, fluoro silicone rubber, vinylmethyl silicone rubber, styrene-butadiene-styrene (SBS) block copolymer, styrene-ethylene-butylene-styrene (SEBS) block copolymer, styrene-isoprene-styrene (SIS) block copolymer, styrene-butadiene rubber (SBR), butadiene rubber (BR), isobutylene-isoprene rubber (IIR), ethylene-propylene rubber (EPR), ethylene-propylene-diene monomer rubber (EPDM), isoprene rubber (IR), isobutylene rubber (IR), acryl rubber, acrylonitrile-butadiene Rubber (ABR), polyurethane, polyether-urethane rubber, polyester-urethane rubber, epichlorohydrin rubber, polychloroprene, polytetrafluoroethylene (PTFE), fluorinated ethylene propylene (FEP), and fluoropolymers, and preferably may include polydimethylsiloxane (PDMS).

In addition, the magnetic material 411 may include one or more selected from the group consisting of cobalt (Co), iron (Fe), nickel (Ni), chromium (Cr), aluminum (Al), samarium (Sm), neodymium (Nd), and an alloy thereof, and preferably may include cobalt (Co).

In addition, the second elastic polymer 412 may include one or more selected from the group consisting of polydimethylsiloxane (PDMS), ecoflex, silicone rubber, fluoro silicone rubber, vinylmethyl silicone rubber, styrene-butadiene-styrene (SBS) block copolymer, styrene-ethylene-butylene-styrene (SEBS) block copolymer, styrene-isoprene-styrene (SIS) block copolymer, styrene-butadiene rubber (SBR), butadiene rubber (BR), isobutylene-isoprene rubber (IIR), ethylene-propylene rubber (EPR), ethylene-propylene-diene monomer rubber (EPDM), isoprene rubber (IR), isobutylene rubber (IR), acryl rubber, acrylonitrile-butadiene rubber (ABR), polyurethane, polyether-urethane rubber, polyester urethane, epichlorohydrin rubber, polychloroprene rubber, polytetrafluoroethylene (PTFE), fluorinated ethylene propylene (FEP), and fluoropolymers, and preferably may include polydimethylsiloxane (PDMS).

In addition, the first elastic polymer 310 may be of the same type as the second elastic polymer 412.

In addition, the lubricant 420 may include at least one selected from the group consisting of perfluorinated oil, silicone oil, dimethylsiloxane oligomer, hydroxy dimethylsiloxane oligomer, mineral oil, and a combination thereof, and preferably may include fluorinated oil.

In addition, the microcomposite 410 is coated on a portion or the entire surface and further includes a coating layer 413 containing a superhydrophobic material, in which the superhydrophobic material may include at least one selected from the group consisting of $SiO_2$, polystyrene, and $TiO_2$ surface-treated with any one selected from the group consisting of dodecyltrichlorosilane, 1H, 1H, 2H, 2H-perfluorooctyltriethoxysilane, and n-octadecyltrithoxysilane.

In addition, the triboelectric generator may be used as a self-powered magnetic field sensor.

Specifically, when the magnetic field is detected in the direction perpendicular to the friction electric generator 10, the lower end, which is a portion of the protrusion-shaped microcomposite 410, is immersed in the lubricant 420, and the upper end, which is the remaining portion, is not being immersed in the lubricant 420. Due to the upper end of the microcomposite 410 not immersed in the lubricant 420, the triboelectric generator can generate electrical energy by contacting liquid droplets dropped on the surface (ON state).

On the other hand, when a magnetic field is sensed in a direction other than the vertical direction to the triboelectric generator 10, the protrusion-shaped microcomposite 410 are entirely immersed in the lubricant 420. The protrusion-shaped microcomposite 410 are entirely immersed in the lubricant 420 so that the triboelectric generator cannot generate electrical energy by contacting droplets dropped on the surface (OFF state).

Therefore, the triboelectric generator can be used as a self-powered magnetic proximity sensor capable of detecting the position and distance of a magnet or an object to which a magnet is attached, depending on whether or not the triboelectric generator generates electric energy.

Figure 3:
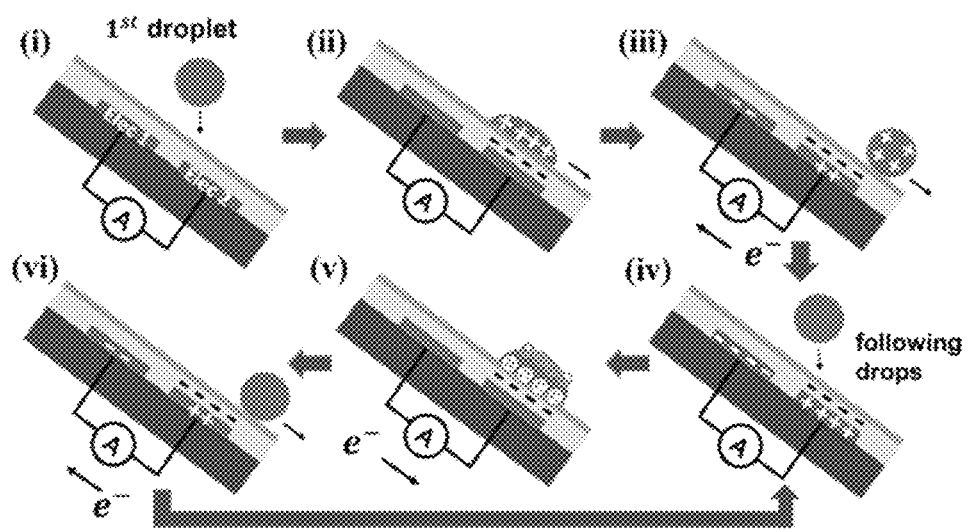
FIG. 3 shows an operating mechanism of a triboelectric generator manufactured according to one embodiment of the present disclosure.

FIG. 3 shows an operating mechanism of a triboelectric generator manufactured according to one embodiment of the present disclosure.

Referring to FIG. 3, the magneto-controllable unit of the triboelectric generator manufactured according to one embodiment of the present disclosure receives electrons through repeated contact with water droplets and has a negative charge, and when the magneto-controllable unit and the water droplets come into contact, the water droplet is positively charged. The water droplets form an electrical double layer with the magneto-controllable unit to partially block negative charges. Due to the asymmetric distribution of charges, the potential between the two electrodes is imbalanced, which induces a flow of free electrons from one electrode to the other, creating an alternating current through an external circuit to reach a new equilibrium. When the water droplet spreads to the maximum in the magneto-controllable unit, the second electrode and the water droplet overlap, and the original balance of the magneto-controllable unit is broken. Next, electron flow is triggered from the first electrode to the second electrode until a new equilibrium is reached ((v) in FIG. 3). As the water droplet slides and contracts, the overlapping area between the second electrode and the water droplet decreases, resulting in reverse electron movement ((vi) in FIG. 3). When the water droplets leave the surface of the magneto-controllable unit, the original static equilibrium is restored ((iv) in FIG. 3). Based on this process, periodically falling water droplets can continuously generate triboelectric signals through a combination of liquid-solid triboelectrification and asymmetric-screening-enabled electrostatic induction.

The present disclosure provides a switch including: a substrate 100; an electrode unit 200 positioned on the substrate 100 and including a first electrode 210 and a second electrode 220; a stabilization layer 300 positioned on the substrate 100 and the electrode unit 200 and including a first elastic polymer 310; a magneto-controllable unit 400 positioned on the stabilization layer 300 and including a lubricant 420 and a plurality of protrusion-shaped microcomposites 410; and a magnet unit 500 positioned at a predetermined portion on the substrate 100 in a direction opposite to the direction facing the electrode unit 200, movable in the direction of the surface of the substrate 100, and including a magnet 510, in which the microcomposite includes a magnetic material 411 and a second elastic polymer 412, and the protrusion-shaped microcomposite is partially immersed in the lubricant.

In addition, the switch may be in an ON state, the magnet 510 may form a magnetic field in the microcomposite 410 in a vertical direction to the substrate 100, a lower end of the protrusion-shaped microcomposite 410 may be immersed in the lubricant, and the upper end, which is the remaining portion, may not be immersed in the lubricant.

In addition, the switch may be in an OFF state, and the magnet 510 may form a magnetic field in the microcomposite 410 in a direction other than a vertical direction on the substrate, and the protrusion-shaped microcomposite 410 may be entirely immersed in a lubricant.

Figure 4:
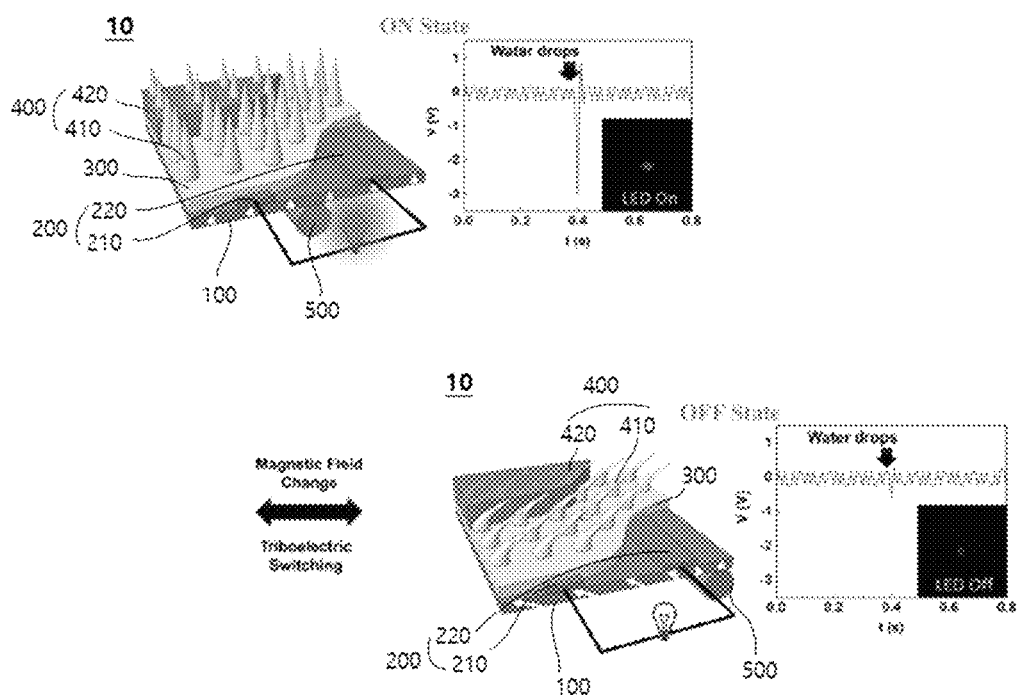
FIG. 4 is a schematic diagram showing the switching between the ON state and the OFF state by moving the magnet part of the switch (changing the direction of the magnetic field) manufactured according to one embodiment of the present disclosure.

FIG. 4 is a schematic diagram showing the switching between the ON state and the OFF state by moving the magnet unit of the switch (changing the direction of the magnetic field) manufactured according to one embodiment of the present disclosure.

According to FIG. 4, when a magnetic field is applied to the plurality of microcomposites in a direction perpendicular to the substrate (left view of FIG. 4), the plurality of microcomposites is aligned in a direction perpendicular to the substrate, and an upper end, which is a portion of the plurality of protrusion-shaped microcomposite, is not immersed in a lubricant, thereby exposing a wide contact area with water droplets, thereby generating a large voltage power through friction charging. This state is called the ON state.

Meanwhile, when a magnetic field is applied to the plurality of microcomposites in a direction other than the vertical direction (right side view of FIG. 4), the plurality of the protrusion-shaped microcomposites is entirely immersed in the lubricant. In this situation, the voltage output is greatly reduced due to frictional electrification interference caused by the lubricant. This state is called the OFF state.

Electrical switching according to the structural change of the microcomposite was further confirmed by connecting light-emitting diodes (LEDs) to the first electrode and the second electrode of the switch manufactured according to one embodiment of the present disclosure.

The voltage generated in the ON state is high enough to turn on the LED with a single drop of water on the surface of the triboelectric generator, as shown in the figure inserted in FIG. 4. However, in the OFF state where the magnetic field is changed, it can be confirmed that the generated voltage is not sufficient to turn on the LED.

The present disclosure provides a method for manufacturing a triboelectric generator, the method including: (a) forming an electrode unit 200 including a first electrode 210 and a second electrode 220 on a substrate 100; (b) coating a first elastic polymer 310 on the substrate 100 and the electrode unit 200 to form a stabilization layer 300 including the first elastic polymer 310; (c) forming a plurality of protrusion-shaped microcomposites 410 by coating a solution containing a magnetic material 411 and a second elastic polymer 412 on the stabilization layer 300; and (d) manufacturing a triboelectric generator 10 by injecting a lubricant 420 to partially immerse the plurality of the protrusion-shaped composites 410 to form a magneto-controllable unit 400.

In addition, the step (c) may include: (c-1) primarily coating a mixed solution including a magnetic material 411 and a second elastic polymer 412 on the stabilization layer 300; (c-2) secondarily coating the mixed solution on the stabilization layer 300; and (c-3) forming a magnetic field in a direction perpendicular to the substrate 100 using a magnet and annealing to form a plurality of protrusion-shaped microcomposites 410.

In addition, the annealing may be performed at a temperature of 80° C. to 120° C., preferably at a temperature of 90° C. to 100° C. When the annealing is performed at a temperature lower than 80° C., it is difficult to form a plurality of microcomposites because the second elastic polymer is not cured, which is undesirable. When the annealing is performed at a temperature higher than 120° C., by-products such as oxides may be formed on the surfaces of the plurality of microcomposites, which is undesirable.

In addition, the method of manufacturing a triboelectric generator may further include (c') coating a part or the entire surface of the microcomposite 410 with a superhydrophobic material to form a coating layer 413 including the superhydrophobic material after step (c).

The present disclosure provides a method for manufacturing a switch, the method including: (1) forming an electrode unit 200 including a first electrode 210 and a second electrode 220 on a substrate 100; (2) coating a first elastic polymer 310 on the substrate 100 and the electrode unit 200 to form a stabilization layer 300 including the first elastic polymer 310; (3) forming a plurality of protrusion-shaped microcomposites 410 by coating a solution containing a magnetic material 411 and a second elastic polymer 412 on the stabilization layer 300; (4) manufacturing a triboelectric generator 500 by injecting a lubricant 420 to partially immerse the plurality of the protrusion-shaped microcomposites 410 to form a magneto-controllable unit 400; and (5) manufacturing a switch by positioning on a predetermined part of the substrate 100 in a direction opposite to a direction facing the electrode unit 200, moving in a plane direction of the substrate 100, and forming a magnet unit 500 including a magnet 510.

Example

Hereinafter, a preferred example of the present disclosure will be described. However, the example is for illustrative purposes, and the scope of the present disclosure is not limited thereto.

Triboelectric Generator Manufacture

Example 1

FIG. 1 shows a schematic diagram of a triboelectric generator according to one embodiment of the present disclosure. Referring to FIG. 1, a triboelectric generator of Example 1 was manufactured.

A cleaned glass was prepared as the substrate 100. A pair of Al tapes (1 cm×2 cm, with a 0.5 mm gap) were attached to the substrate 100 to form an electrode unit 200 including a first electrode 210 and a second electrode 220 positioned parallel to the first electrode 210. The PDMS base (Sylgard 184) and the curing agent (Sylgard 184) were mixed in a weight ratio of 10:1, and then the mixture was applied on the electrode unit 200 using a doctor-blade to form a stabilization layer 300 having a thickness of 150 μm.

A mixture obtained by mixing PDMS base (Sylgard 184) 411, a curing agent (Sylgard 184), and a magnetic material (cobalt nanoparticle of 2 μm, Sigma Aldrich) 412 in a weight ratio of 1:1:2 was spin-coated twice on the stabilizing layer. At this time, the first spin coating was performed at 500 rpm for 5 seconds, and the second spin coating was performed at 2,000 rpm for 20 seconds. Subsequently, a magnetic field was applied perpendicularly to the substrate using a heat-resistant magnet (50 mm×5 mm×20 mm, superficial magnetic field intensity of 4500 Gs), and annealed at 95° C. for 1 hour to form a plurality of microcomposites 410. In order to make the surface of the microcomposite 410 superhydrophobic, an ethanol solution containing SAM-treated $SiO_2$ using dodecyltricholorosilane was spray-coated to form a coating layer 413 on a portion or the entire surface of the microcomposite 410. Thereafter, fluorinated oil (DuPont Krytox 103) is injected as a lubricant 420 into the lower end of the microcomposite 410 to form a magneto-controllable unit 400, thereby manufacturing a triboelectric generator 10.

Switch Manufacture

Example 2

A switch was manufactured by positioning on a predetermined part of the substrate 100 in a direction opposite to the electrode unit 200 of the triboelectric generator manufactured according to Example 1, and by forming a magnet unit 500 including a magnet 510 that may move in a plane direction of the substrate 100.

Experimental Example

Experimental Example 1: Confirmation of Formation of the Plurality of Microcomposites FIG. 2 shows top and cross-sectional SEM images after forming a microcomposite when a triboelectric generator is manufactured according to Example 1.

Figure 2:
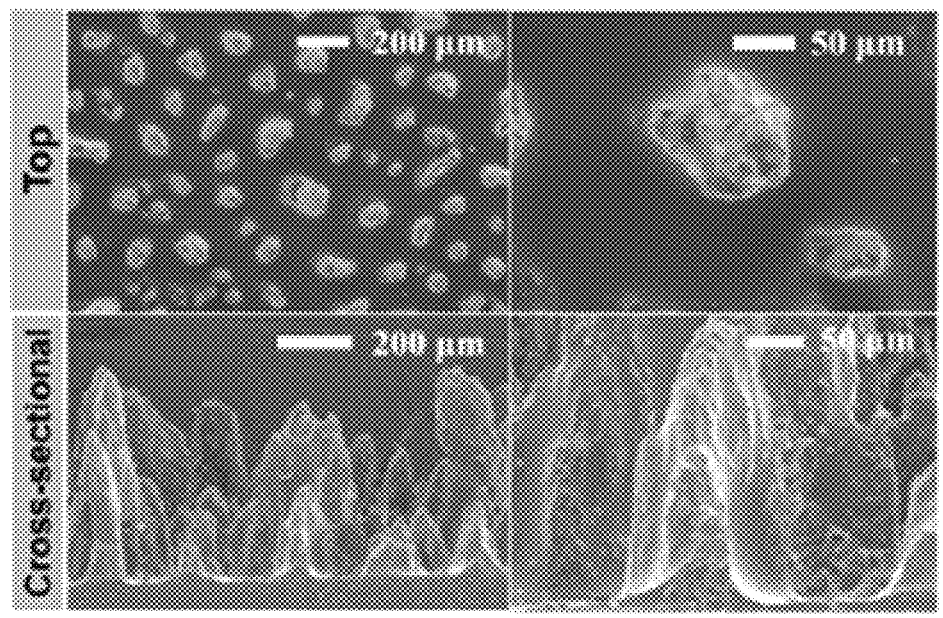
FIG. 2 shows top and cross-sectional SEM images after forming a microcomposite when a triboelectric generator is manufactured according to Example 1.

According to FIG. 2, it can be seen that the average height and average diameter of the plurality of microcomposites are about 580 μm and about 170 μm, respectively.

Figure 5A:
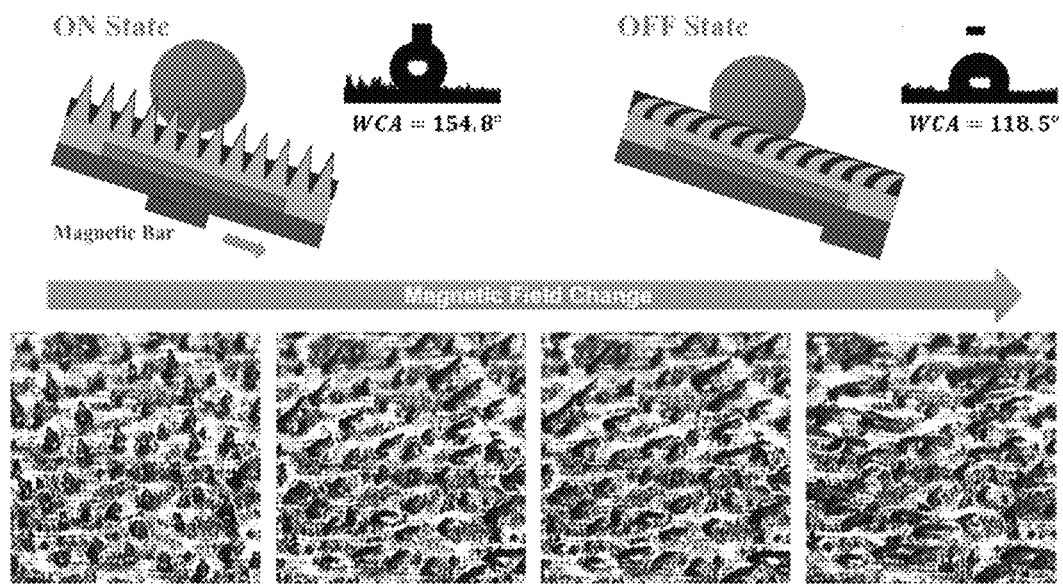
FIG. 5A shows the apparent characteristics of ON and OFF states of a triboelectric generator manufactured according to one embodiment of the present disclosure.

Experimental Example 2: Check the Surface Change of the Magneto-Controllable Unit of the Triboelectric Generator According to the Position of the Magnet FIG. 5A shows the apparent characteristics of ON and OFF states of a triboelectric generator manufactured according to one embodiment of the present disclosure. In addition, FIG. 5A shows that the structure of the microcomposite changes as the magnetic bar moves, that is, the direction of the magnetic field changes.

According to FIG. 5A, the water contact angle (WCA) measured in the ON state (when the lower end, which is a portion of the protrusion-shaped microcomposite, is immersed in the lubricant, and the upper end, which is the remaining portion, is not immersed in the lubricant) is 154.8±0.1°, which shows a slippery Wenzel state due to the upper end, which is a portion of the protrusion-shaped microcomposite that is not immersed in the lubricant. On the other hand, in the OFF state (when the protrusion-shaped microcomposite is entirely immersed in the lubricant), the water contact angle (WCA) decreases to 118.5±0.1°, showing the sliding behavior of droplets with a low sliding angle and little difference between the advancing angle and the receding angle, as in the slippery lubricating-infused porous surfaces (SLIPS). In this slippery state, the droplet is in direct contact with the nearly continuous lubricant covering the microcomposite. These switchable wetting properties result from ferromagnetic cobalt particles inside the microcomposites.

Figure 5B:
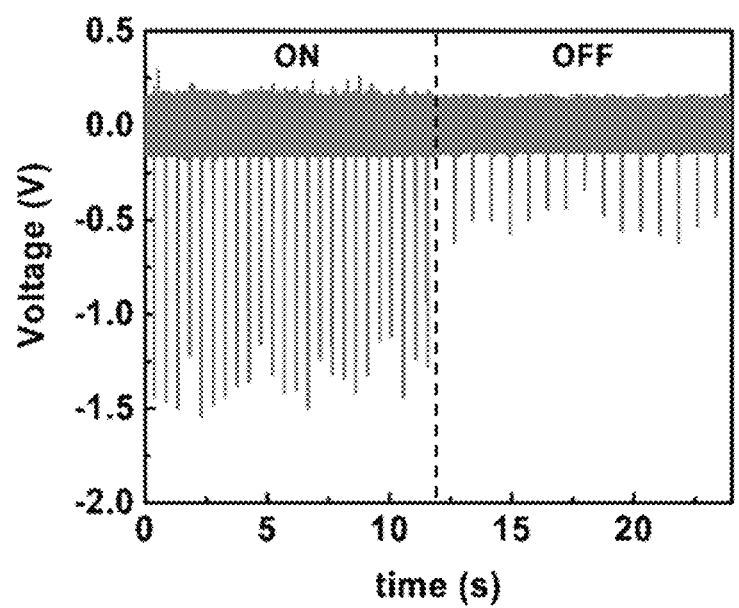
FIG. 5B shows the triboelectric switch operation of the triboelectric generator of Example 1 at a fixed drop height and inclination angle in terms of open circuit voltage ($V_{OC}$)
Figure 5C:
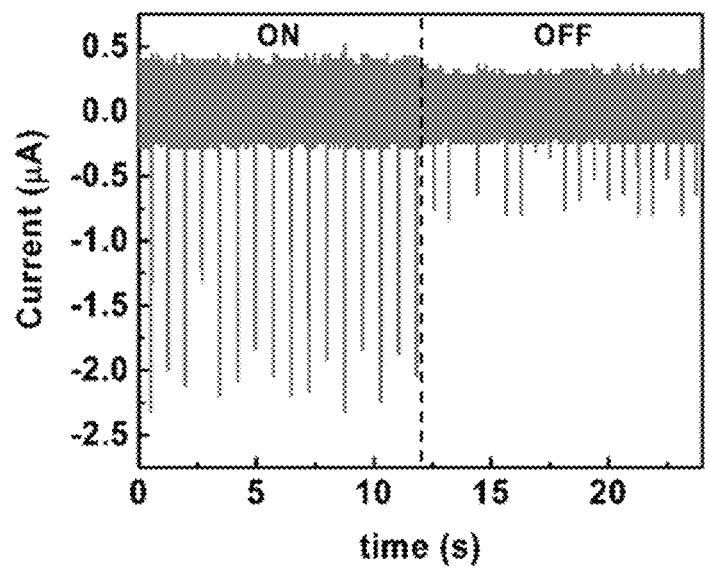
FIG. 5C shows the triboelectric switch operation of the triboelectric generator of Example 1 at a fixed drop height and inclination angle in terms of short-circuit current ($I_{SC}$)

FIG. 5B shows the triboelectric switch operation of the triboelectric generator of Example 1 at a fixed drop height and inclination angle in terms of open circuit voltage ($V_{OC}$), and FIG. 5C shows the triboelectric switch of Example 1 at a fixed drop height and inclination angle in terms of short circuit current ($I_{SC}$). At this time, the fixed drop height is 5 cm, and the fixed inclination angle is 45°.

According to FIGS. 5B and 5C, it can be seen that the open-circuit voltage and short-circuit current are noticeably different in the ON (slippery Wenzel) and OFF (slippery) states at a given droplet drop height and inclination angle. Specifically, it can be seen that the open circuit voltage and short circuit current generated in the ON state are 1.35±0.12 V and 2.03±0.24 μA, respectively, but rapidly decreased to 0.52±0.07 V and 0.69±0.13 μA, respectively, in the OFF state.

The resulting power output ratio shows a difference of more than three times in the ON/OFF state, confirming the triboelectric switching driven by the reversible surface wetting state of the triboelectric generator manufactured according to Example 1.

Figure 6A:
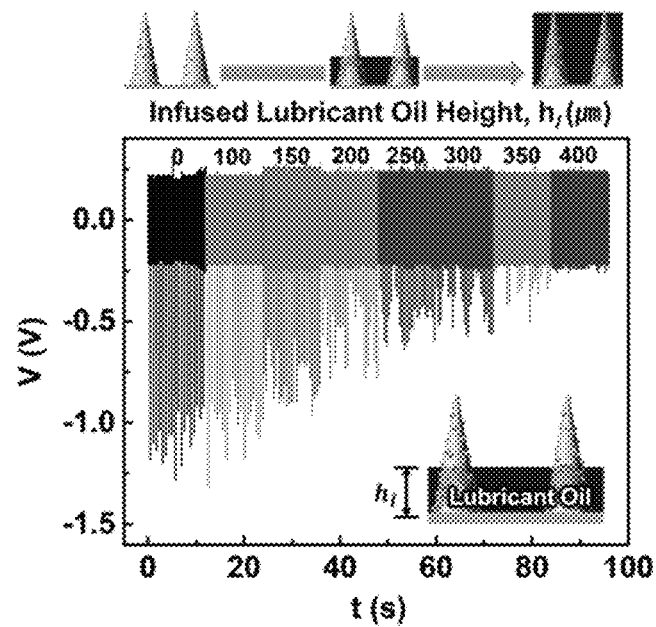
FIG. 6A shows the dependence of the electrical output according to the height ($h_1$) of the lubricant when the upper end of the microcomposite protrusion of the triboelectric generator manufactured according to Example 1 is vertically aligned with the substrate.
Figure 6B:
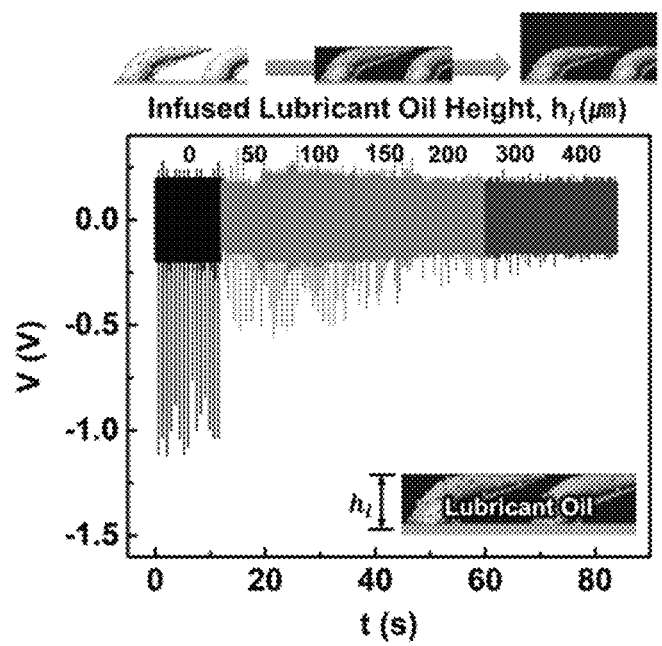
FIG. 6B shows the dependence of the electrical output according to the height ($h_1$) of the lubricant when the upper end of the microcomposite protrusion of the triboelectric generator manufactured according to Example 1 is bent in the horizontal direction to the substrate.

Experimental Example 3: Check the Switching Characteristics of Triboelectric Generator According to the Height of the Lubricant FIG. 6A shows the dependence of the electrical output according to the height ($h_1$) of the lubricant when the upper end of the microcomposite protrusion of the triboelectric generator manufactured according to Example 1 is vertically aligned with the substrate and FIG. 6B shows the dependence of the electrical output according to the height ($h_1$) of the lubricant when the upper end of the microcomposite protrusion of the triboelectric generator manufactured according to Example 1 is bent in the horizontal direction to the substrate. At this time, the lubricant height was controlled from 0 μm to 400 μm.

According to FIG. 6A, when the upper end of the protrusion-shaped microcomposite is aligned in the vertical direction to the substrate (ON state), the voltage decrease was negligible when the lubricant height has in a range of 0 to 100 μm, but the voltage output gradually decreased at higher lubricant heights. However, the voltage output gradually decreased at higher lubricant heights, and it can be seen that almost no voltage is generated at 400 μm of lubricant height.

According to FIG. 6B, when the upper end of the protrusion-shaped microcomposite is bent horizontally to the substrate (OFF state), it can be seen that the voltage output decreases rapidly when the lubricant height is about 50 μm and further decreases at a higher lubricant height.

Figure 6C:
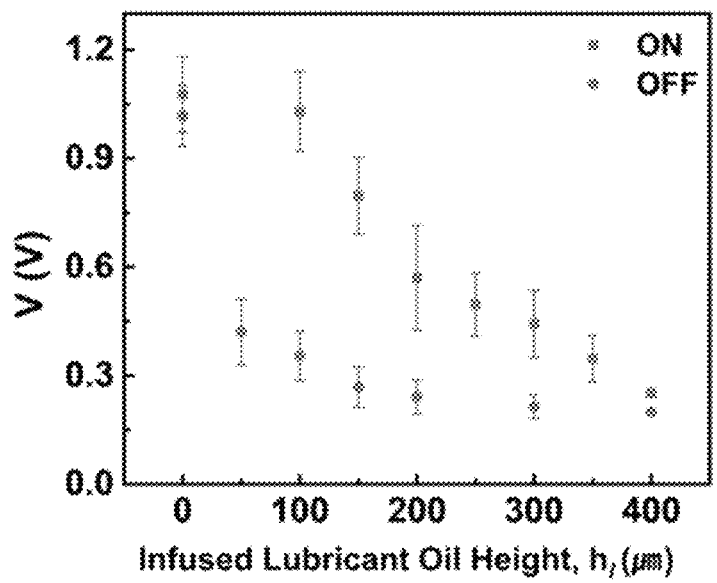
FIG. 6C summarizes the relationship between the lubricant level and the voltage output in ON and OFF states of the triboelectric generator manufactured according to Example 1.

FIG. 6C summarizes the relationship between the lubricant level and the voltage output in ON and OFF states of the triboelectric generator manufactured according to Example 1.

According to FIG. 6C, it can be seen that the voltage output in the ON state monotonically decreases as the height of the lubricant increases, whereas the voltage drops rapidly in the OFF state. On the other hand, it can be seen that the voltage generation is only slightly different between the two states when no lubricant is added ($h_1=0$ μm). These results confirm that the lubricant plays an important role in the triboelectric generator by preventing the direct triboelectric charge between the microcomposite and water droplets.

Figure 6D:
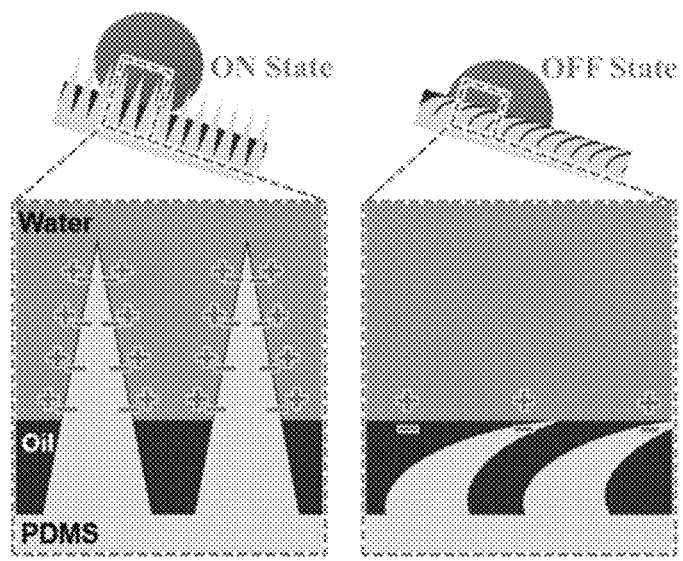
FIG. 6D shows a triboelectric switching mechanism in an ON/OFF state of a triboelectric generator manufactured according to an embodiment of the present disclosure.

FIG. 6D shows a triboelectric switching mechanism in an ON/OFF state of a triboelectric generator manufactured according to an embodiment of the present disclosure.

According to FIG. 6D, the ON state is a state in which the upper end of the protrusion-shaped microcomposite is aligned in the vertical direction on the substrate, the lower end, which is a portion of the microcomposite protrusion, is immersed in the lubricant, and the upper end, which is the remaining portion, is immersed in the lubricant. Thus, a significant portion of the microcomposite is exposed to direct contact with water droplets. As a result, these direct contact charges produce a high density induced charge in the triboelectric generator.

On the other hand, the OFF state is a state in which the upper end of the microcomposite protrusion is bent in a horizontal direction to the substrate, and the protrusion-shaped microcomposite is entirely immersed in the lubricant. Therefore, the microcomposite does not directly contact water droplets, and the induced charge density is greatly reduced due to the blocking effect of the lubricant.

Figure 7A:
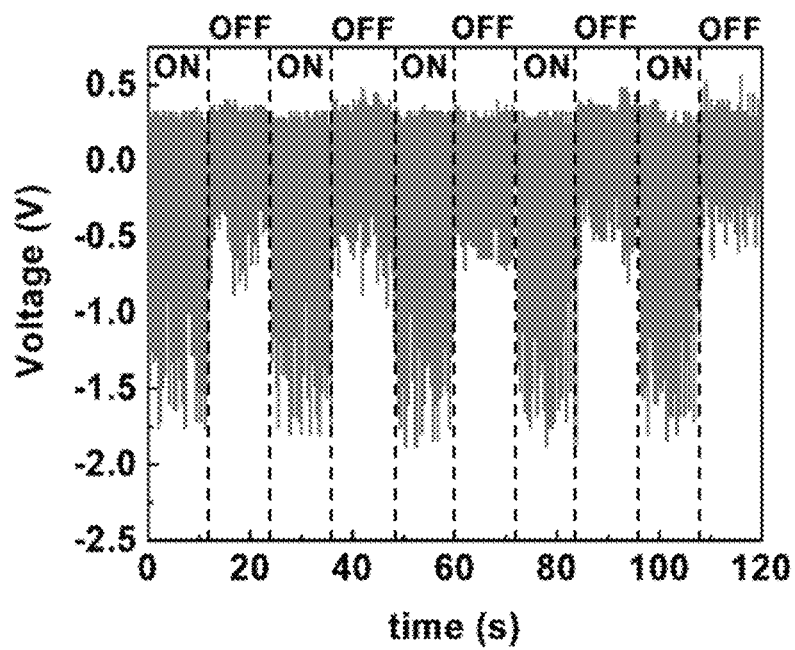
FIG. 7A shows the switching voltage cycles of the triboelectric generator of Example 1 at a fixed drop height and inclination angle.

Experimental Example 4: Check the Voltage Output According to the Stability of the Triboelectric Generator, the Drop Height, and the Inclination Angle FIG. 7A shows the switching voltage cycles of the triboelectric generator of Example 1 at a fixed drop height and inclination angle. At this time, the fixed drop height is 5 cm, and the fixed inclination angle is 45°.

According to FIG. 7A, the triboelectric generator manufactured according to Example 1 shows a highly durable ON/OFF voltage output at a constant rate of about 3 even when the direction of the magnetic field is periodically changed (at about 10 second intervals).

Figure 7B:
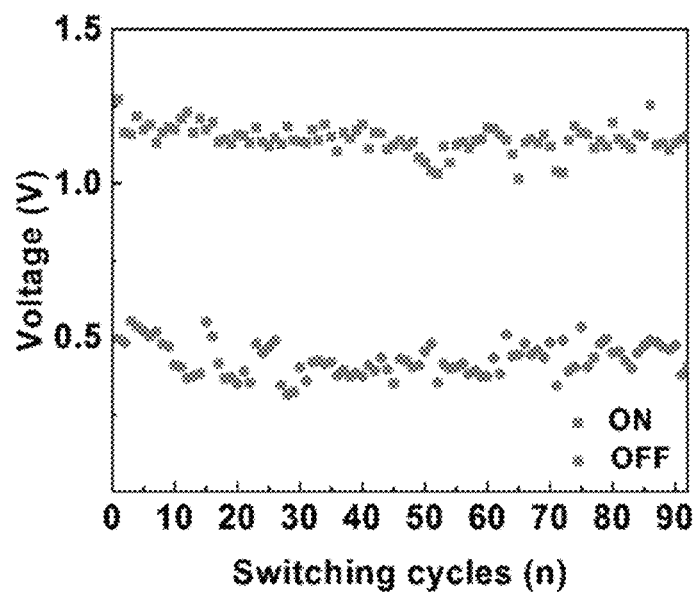
FIG. 7B shows an evaluation of stability and reversibility through switching cycles of the triboelectric generator of Example 1.

FIG. 7B shows an evaluation of stability and reversibility through switching cycles of the triboelectric generator of Example 1.

According to FIG. 7B, it can be confirmed that the triboelectric generator manufactured according to Example 1 has the excellent electrical output and stable switching even after 30 cycles.

Figure 7C:
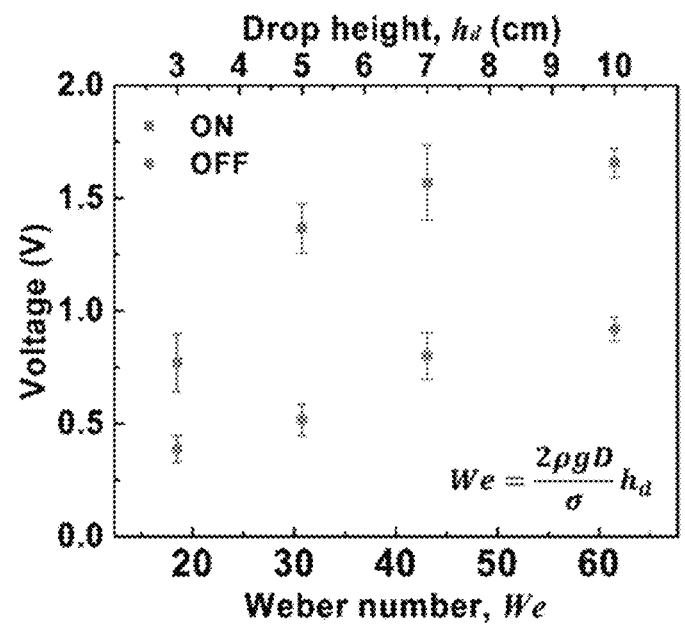
FIG. 7C shows the switching characteristics of the triboelectric generator manufactured according to Example 1 for various Weber numbers and drop heights ($h_d$)

FIG. 7C shows the switching characteristics of the triboelectric generator manufactured according to Example 1 for various Weber numbers and drop heights ($h_d$). At this time, the size of the droplet was 50 μL, and the inclination angle was fixed at 45°. The Weber number (We) was calculated according to Formula 1 below.

$$We = \rho v^2 D/\sigma = \frac{2\rho g D}{\sigma} h_d \quad \text{[Formula 1]}$$

In Formula 1,
ρ is the density of water,
v is the velocity of the water droplet,
D is the diameter of the water droplet,
σ is the surface tension of water.

In Formula 1, since all parameters except v are inherent properties of water, the Weber number (We) is directly proportional to the drop height ($h_d$) of the water droplet.

According to FIG. 7C, it can be confirmed that the electrical energy converted by the impact energy of the water droplet changes with We in the same manner as in the ON state and the OFF state, that is, the switching signal, rises similarly. The impact energy is directly related to the impact dynamics of the water droplet, especially the contact area and velocity. A faster contact between the water droplet and the surface would be advantageous for generating a higher charge difference, i.e., a higher voltage generation between the first electrode and the second electrode. When a droplet in contact with the surface spreads, the change in contact area between the droplet and the electrode breaks the electrostatic balance and allows electrons to move from the other electrode to the overlapping electrode. Thus, the electrical output generated is proportional to the contact area change rate. In other words, as the effective contact area, defined as the maximum spreading area of water droplets, increases, the voltage output also increases because the number of charges caused by triboelectric charge is proportional to the contact area.

Therefore, the higher the We of the water droplet, the higher the voltage, that is, the higher the signal can be generated in the triboelectric generator manufactured according to Example 1.

However, it should be noted that increasing the We of the water droplet to more than 60 saturates the output voltage due to the fragmentation of the water droplet at the moment of contact. At a water droplet drop height ($h_d$) of 15 cm or more, the droplets were fragmented due to too high impact pressure, resulting in a random distribution of the contact areas, resulting in voltage output fluctuations.

Figure 7D:
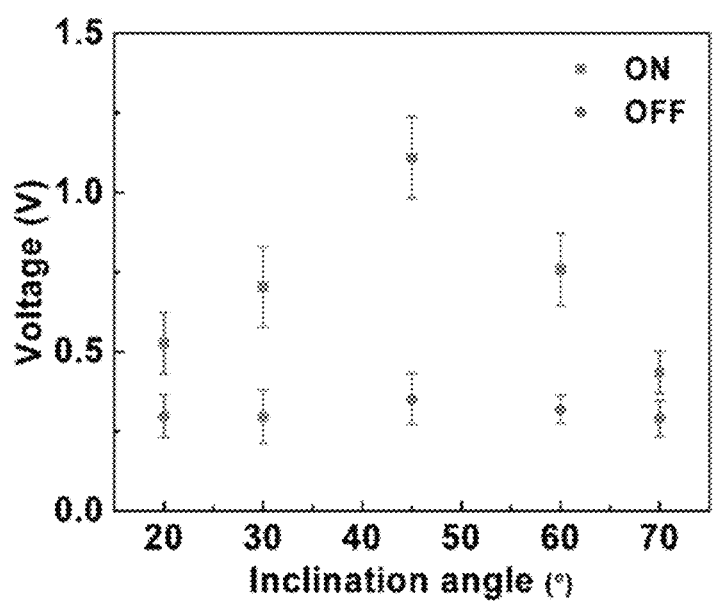
FIG. 7D shows the switching characteristics of the triboelectric generator manufactured according to Example 1 for various inclination angles.

FIG. 7D shows the switching characteristics of the triboelectric generator manufactured according to Example 1 for various inclination angles. At this time, the drop height was fixed at 5 cm, and the experiment was conducted in the range of an inclination angle in a range of 20° to 70°. The above inclination angle 20° is the minimum angle at which a water drop completely rolls off the magneto-controllable unit of the triboelectric generator manufactured according to Example 1.

According to FIG. 7D, it can be confirmed that the voltage change generated in the OFF state is negligible according to the inclination angle. This means that the continued spread lubricant maintains OFF-state characteristics with low electrical output. Meanwhile, in the ON state, it can be seen that the generated voltage increases as the inclination angle reaches 45° and then decreases as the inclination angle increases. This can be explained by the influence of the rate of change in the contact area on the charge density.

Figure 7E:
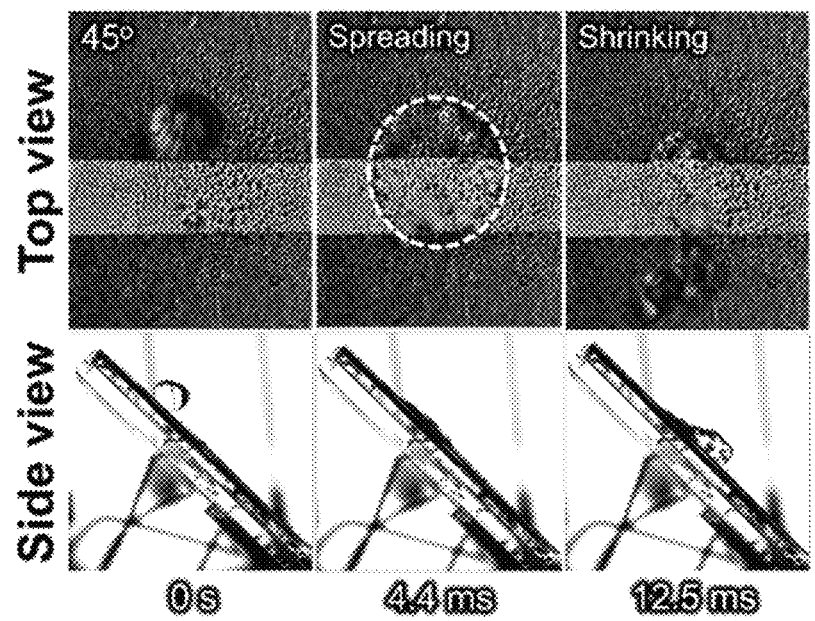
FIG. 7E shows an ultra-high-speed camera image of water droplets at the moments of maximum spread and contraction in contact with the magneto-controllable unit at the inclination angle of 45°, where the voltage of the triboelectric generator manufactured according to Example 1 is maximized.
Figure 7F:
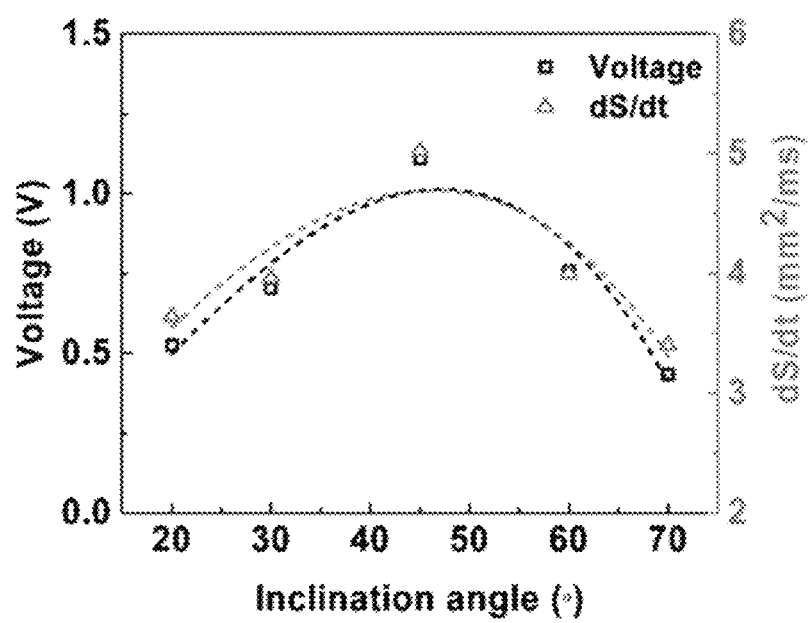
FIG. 7F shows a voltage power and a speed of change in a contact area when water droplets contact the magneto-controllable unit at various inclination angles in the triboelectric generator manufactured according to Example 1.

FIG. 7E shows a relationship between an ultra-high-speed camera image of water droplets at the moment of maximum spread and contraction in contact with the magneto-controllable unit at the inclination angle of 45°, where the voltage of the triboelectric generator manufactured according to Example 1 is maximized, and a speed of change in a contact area and a voltage power.

According to FIG. 7E, it can be seen that the highest voltage is generated in the ON state because the contact area change speed is the largest at the inclination angle of 45°, as confirmed through high-speed camera observation. In addition, it can be confirmed that the contact area changes rate and the voltage output show similar tendencies. Through this, it can be confirmed once again that the triboelectric-based switching mechanism of the triboelectric generator manufactured according to one embodiment of the present disclosure is based on the effective contact area of water droplets and the interference of the lubricant.

Figure 8A:
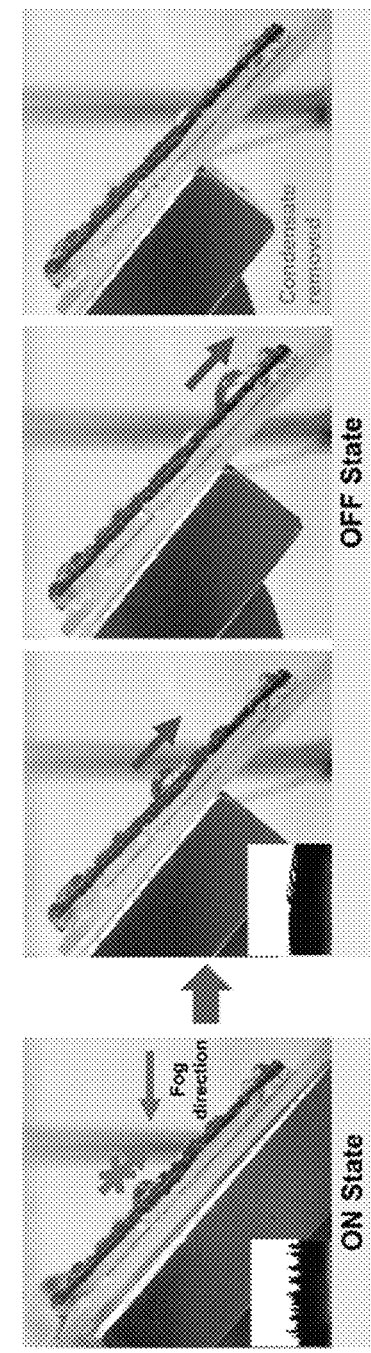
FIG. 8A shows the cleaning performance for sustainable power generation when the triboelectric generator manufactured according to Example 1 is placed in an extremely humid environment.
Figure 8B:
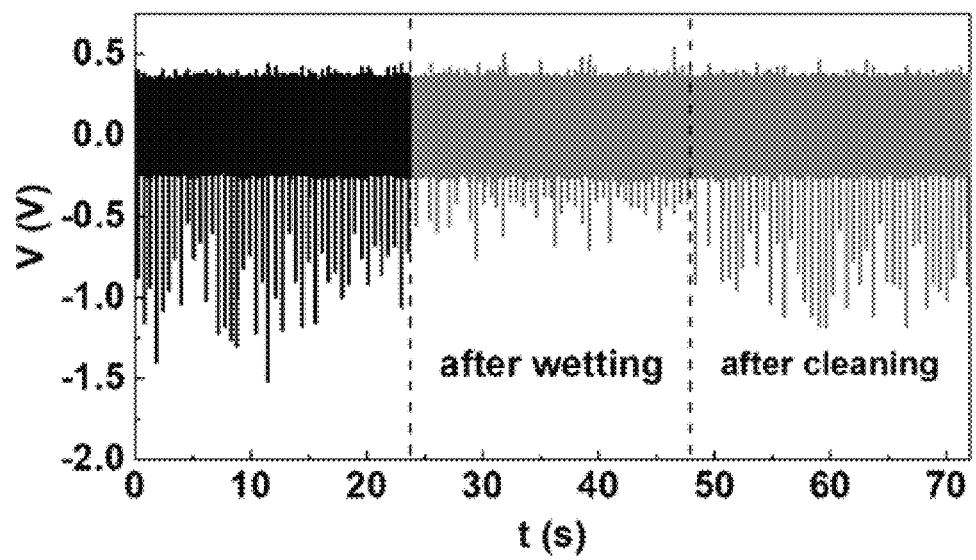
FIG. 8B shows the cleaning effect for restoring the electrical output of the triboelectric generator manufactured according to Example 1.
Figure 8C:
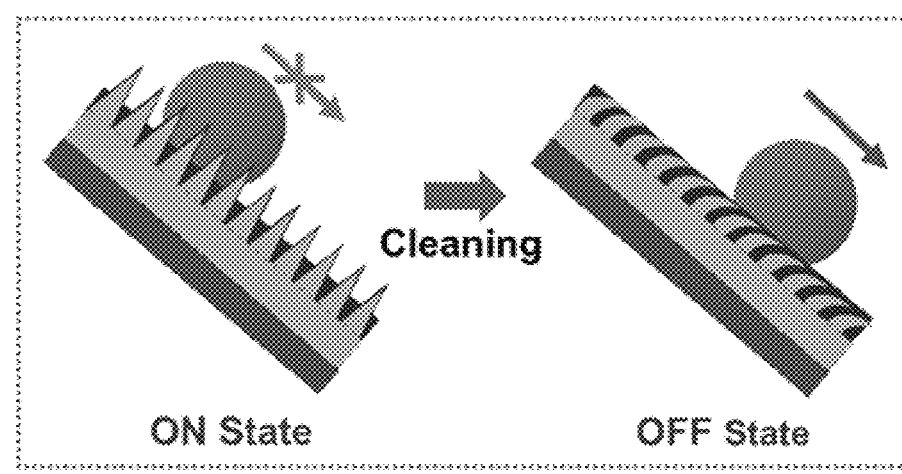
FIG. 8C shows a cleaning process of the triboelectric generator manufactured according to Example 1.

Experimental Example 5: Check Performance Change of Triboelectric Generator after Cleaning FIG. 8A shows the cleaning performance for sustainable power generation when the triboelectric generator manufactured according to Example 1 is placed in an extremely humid environment, FIG. 8B shows a cleaning effect of the friction electric generator manufactured according to Example 1, and FIG. 8C shows a cleaning process of the triboelectric generator manufactured according to Example 1. The extremely humid environment was formed by continuously supplying mist with a humidifier.

According to FIGS. 8A and 8B, the large surface portion of the microcomposite in a slippery Wenzel state (ON state) allow rapid collection of water droplets from the fog. When the water droplets continue to collect and increase in volume enough, the triboelectric generator is completely wet. The transition to the wet state greatly reduces the charge induced by the liquid-solid triboelectric charge, thereby reducing the electrical output.

According to FIG. 8C, the condensed water droplets on the surface of the triboelectric generator can be removed by changing the direction of the magnetic field to switch from the slippery Wenzel state (ON state) to the slippery state (OFF state). As a result, in a slippery state, the immobilized droplet rolls off the surface without being immobilized in contact with the nearly flat-state lubricant. This phenomenon may be called cleaning because water droplets covering the triboelectric generator are removed and restored the triboelectric charge. Recovery of triboelectric charge by cleaning can be confirmed by restoring the corresponding voltage output.

Therefore, the triboelectric generator manufactured according to one embodiment of the present disclosure can be used even in high humidity conditions and can be cleaned only by changing the direction of the magnetic field without a separate cleaning process.

The scope of the present disclosure is defined by the following claims rather than the above detailed description, and all changes or modifications derived from the meaning and scope of the claims and their equivalent concepts should be interpreted as falling into the scope of the present disclosure.

What is claimed is:

1. A switch comprising:
   a substrate;
   an electrode unit positioned on the substrate and comprising a first electrode and a second electrode;
   a stabilization layer positioned on the substrate and the electrode unit and comprising a first elastic polymer;
   a magneto-controllable unit positioned on the stabilization layer and comprising a lubricant and a plurality of protrusion-shaped microcomposites; and
   a magnet unit comprising a magnet and being movable in a direction along a plane of the substrate, the magnet unit being positioned on a portion of a first surface of the substrate, the first surface being opposite to a second surface facing the electrode unit,
   wherein the microcomposite comprises a magnetic material and a second elastic polymer, and the protrusion-shaped microcomposite is partially immersed in the lubricant.

2. The switch of claim 1, wherein the switch generates electrical energy by contact between a liquid droplet falling on the magneto-controllable unit and the microcomposite of the magneto-controllable unit.

3. The switch of claim 2, wherein the electrical energy is generated by at least one selected from the group consisting of a triboelectric charging phenomenon and an electrostatic induction phenomenon generated by the contact.

4. The switch of claim 1, wherein the protrusion has any one shape selected from the group consisting of a conical shape, a polygonal pyramidal shape, a cylindrical shape, a polygonal columnar shape, and a combination thereof.

5. The switch of claim 1, wherein the substrate comprises one or more selected from the group consisting of glass, silicon, nickel, stainless steel, zinc-coated carbon steel, pure carbon steel, copper, titanium, zinc, steel, polyester, polyimide, polyamide, polyethylene, polypropylene, fluorine-doped tin oxide (FTO), indium tin oxide (ITO), indium zinc oxide (IZO), indium zinc tin oxide (IZTO), aluminum zinc oxide (AZO), indium tin oxide-silver-indium tin oxide (ITO—Ag—ITO), indium zinc oxide-silver-indium zinc oxide (IZO—Ag—IZO), indium zinc tin oxide-silver-indium zinc tin oxide (IZTO—Ag—IZTO), and aluminum zinc oxide-silver-aluminum zinc oxide (AZO—Ag—AZO).

6. The switch of claim 1, wherein each of the first electrode and the second electrode comprises one or more selected from the group consisting of Al, Au, Ag, Be, Bi, Co, Cu, Cr, Cd, Fe, Ga, Hf, In, Ir, Mn, Mo, Mg, Ni, Nb, Pb, Pd, Pt, Rh, Re, Ru, Sb, Sn, Ta, Te, Ti, V, W, Zr, Zn, FTO, and ITO.

7. The switch of claim 1, wherein the first elastic polymer comprises one or more selected from the group consisting of polydimethylsiloxane (PDMS), ecoflex, silicone rubber, fluoro silicone rubber, vinylmethyl silicone rubber, styrene-butadiene-styrene (SBS) block copolymer, styrene-ethylene-butylene-styrene (SEBS) block copolymer, styrene-isoprene-styrene (SIS) block copolymer, styrene-butadiene rubber (SBR), butadiene rubber (BR), isobutylene-isoprene rubber (IIR), ethylene-propylene rubber (EPR), ethylene-propylene-diene monomer rubber (EPDM), isoprene rubber (IR), isobutylene rubber (IR), acryl rubber, acrylonitrile-butadiene rubber (ABR), polyurethane, polyether-urethane rubber, polyester urethane, epichlorohydrin rubber, polychloroprene rubber, polytetrafluoroethylene (PTFE), fluorinated ethylene propylene (FEP), and fluoropolymers.

8. The switch of claim 1, wherein the magnetic material comprises one or more selected from the group consisting of cobalt (Co), iron (Fe), nickel (Ni), chromium (Cr), aluminum (Al), samarium (Sm), neodymium (Nd), and an alloy thereof.

9. The switch of claim 1, wherein the second elastic polymer comprises one or more selected from the group consisting of polydimethylsiloxane (PDMS), ecoflex, silicone rubber, fluoro silicone rubber, vinylmethyl silicone rubber, styrene-butadiene-styrene (SBS) block copolymer, styrene-ethylene-butylene-styrene (SEBS) block copolymer, styrene-isoprene-styrene (SIS) block copolymer, styrene-butadiene rubber (SBR), butadiene rubber (BR), isobutylene-isoprene rubber (IIR), ethylene-propylene rubber (EPR), ethylene-propylene-diene monomer rubber (EPDM), isoprene rubber (IR), isobutylene rubber (IR), acryl rubber, acrylonitrile-butadiene rubber (ABR), polyurethane, polyether-urethane rubber, polyester urethane, epichlorohydrin rubber, polychloroprene rubber, polytetrafluoroethylene (PTFE), fluorinated ethylene propylene (FEP), and fluoropolymers.

10. The switch of claim 1, wherein the first elastic polymer is the same type as the second elastic polymer.

11. The switch of claim 1, wherein the lubricant comprises one or more selected from the group consisting of perfluorinated oil, silicone oil, dimethylsiloxane oligomer, hydroxy dimethylsiloxane oligomer, mineral oil, and a combination thereof.

12. The switch of claim 1, wherein the microcomposite further comprises a coating layer comprising a superhydrophobic material and being partially or entirely covering a surface of the microcomposite, and
the superhydrophobic material comprises at least one selected from the group consisting of $SiO_2$, polystyrene, and $TiO_2$ surface-treated with any one selected from the group consisting of dodecyltrichlorosilane, 1H,1H,2H,2H-perfluorooctyltriethoxysilane, and n-Octadecyltrithoxysilane.

13. The switch of claim 1, wherein the switch is in an ON state, and
wherein when the switch is in the ON state, the magnet forms a magnetic field perpendicular to the substrate, in the microcomposite, a lower end being a portion of the protrusion-shape of the microcomposite is immersed in the lubricant, and an upper end being the remaining portion is not immersed in the lubricant.

14. The switch of claim 1, wherein the switch is in an OFF state, and
wherein when the switch is in the OFF state, the magnet forms a magnetic field not perpendicular to the substrate, in the microcomposite, and the protrusion-shaped microcomposite is entirely immersed in the lubricant.

15. A method of manufacturing a triboelectric generator, the method comprising:
(a) forming an electrode unit comprising a first electrode and a second electrode on a substrate;
(b) applying a first elastic polymer on the substrate and the electrode unit to form a stabilization layer comprising the first elastic polymer;
(c) forming a plurality of protrusion-shaped microcomposites by applying a mixed solution containing a magnetic material and a second elastic polymer on the stabilization layer; and
(d) manufacturing a triboelectric generator by forming a magneto-controllable unit by injecting a lubricant such that the plurality of the protrusion-shaped microcomposites is partially immersed in the lubricant injected,
wherein the step (c) comprises:
(c-1) primarily coating the stabilization layer with the mixed solution containing a magnetic material and the second elastic polymer;
(c-2) secondarily coating the stabilization layer with the mixed solution; and
(c-3) forming a magnetic field perpendicular to the substrate using a magnet and annealing to form the plurality of protrusion-shaped microcomposites.

16. The method of claim 15, wherein the method comprises, after the step (c), (c') applying a superhydrophobic material on a portion or the entirety of the surface of each of the microcomposites to form a coating layer comprising a superhydrophobic material.

* * * * *